UNITED STATES PATENT OFFICE.

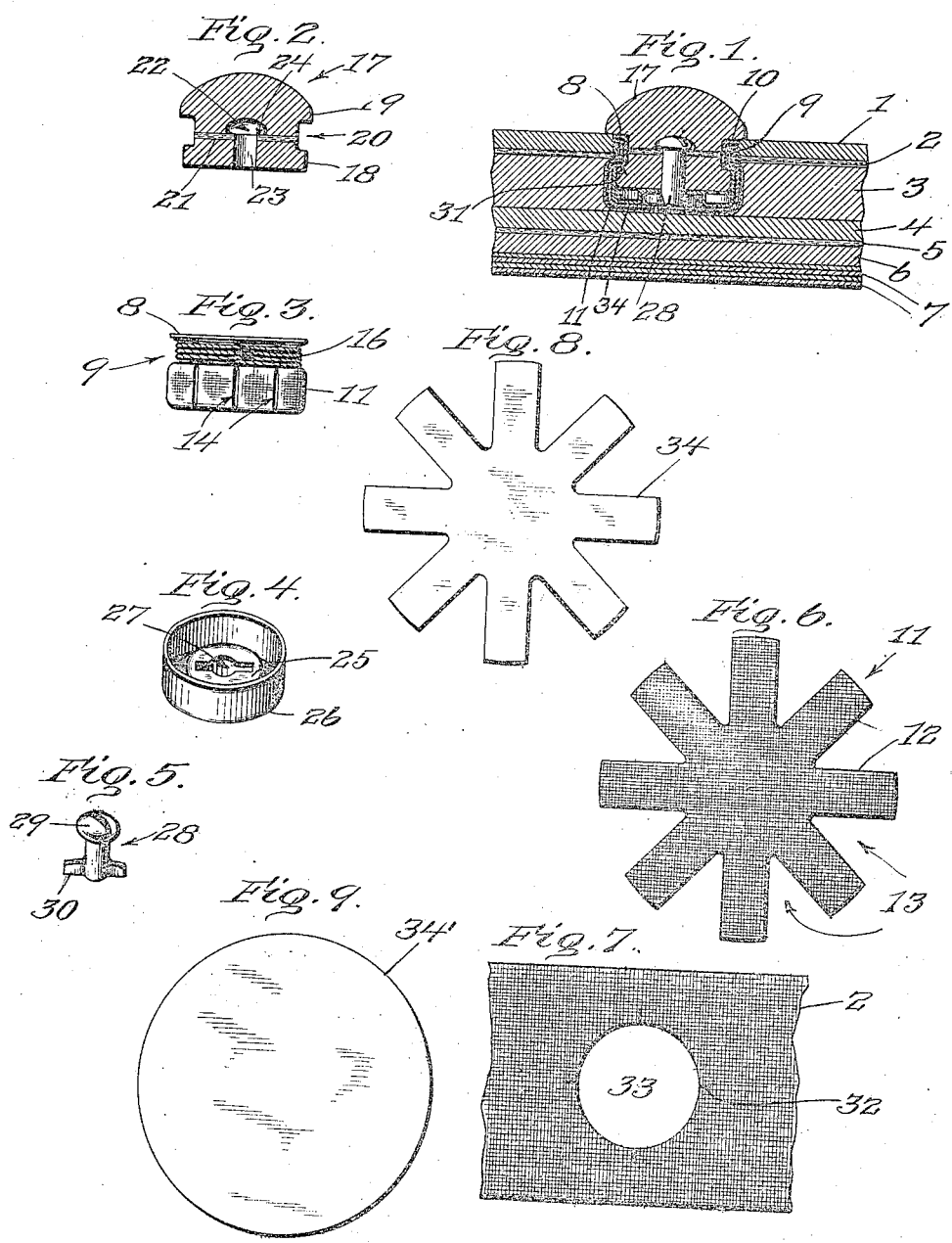

JUNIUS A. BOWDEN, OF LOS ANGELES, CALIFORNIA.

TIRE.

1,031,979.

Specification of Letters Patent.

Patented July 9, 1912.

Application filed July 15, 1909. Serial No. 507,867.

*To all whom it may concern:*

Be it known that I, JUNIUS A. BOWDEN, a citizen of the United States, residing at Los Angeles, in the county of Los Angeles and State of California, have invented a new and useful Tire, of which the following is a specification.

This invention relates to a tire of a type described in several previous applications of mine, Serial No. 414827, filed Feb. 7, 1908; Serial No. 427544, filed April 16, 1908; Serial No. 466178, filed Dec. 5, 1908; Serial No. 468397, filed Dec. 19, 1908; and Serial No. 498363, filed May 25, 1909, wherein studs or projections are detachably secured in the tread surface of the tire. I have therein shown detachable studs seated in receptacles in the tire. Such receptacles are preferably made of metal and should be firmly secured in the tire. The receptacles may be secured in the tire by metallic means or they may be vulcanized in the tire. There is considerable difficulty, however, in vulcanizing the metal to the rubber and the main object of the present invention is to overcome that difficulty and provide a construction whereby the metal receptacles are firmly secured in place by vulcanizing.

Another object is to provide an improved form of stud and means for retaining the stud in the receptacle.

It is well known that rubber may be vulcanized perfectly to canvas or the like fabric, while it is very difficult to vulcanize the rubber to metal in such a way that the rubber will adhere to the metal with sufficient firmness. By covering each metal receptacle with a casing of canvas or the like fabric and by securing this fabric firmly to the metal receptacle and then vulcanizing the rubber to the canvas covered receptacle, I obtain the main object sought, as the metal receptacle is secured to the fabric and can not be removed therefrom and as the fabric in turn is perfectly vulcanized with the rubber, the receptacle is thus firmly secured in the rubber. A detailed description of this method of construction and of the various details of the stud and their securing means will be brought out in the following description.

Referring to the drawings: Figure 1 is a vertical section in detail through a portion of the tire taken diametrically through a receptacle with its contained stud. Fig. 2 is a section through a stud. Fig. 3 is a side elevation of a receptacle showing the fabric secured thereto before the insertion and vulcanization of the receptacle in the tire. Fig. 4 is a perspective view in detail of the internal washer. Fig. 5 is a perspective view in detail of the anchor pin. Fig. 6 is a plan view of the fabric casing before it is secured to the receptacle. Fig. 7 is a plan view of the portion of the tire canvas adjacent the neck of the receptacle and illustrates the slitting of the canvas at the orifice to permit the assemblage of the parts. Fig. 8 is a plan view of the rubber casing. Fig. 9 is a modified form of the rubber casing.

1 designates the outer rubber layer of the tire under which is a canvas layer 2, succeeding which are layers of rubber 3 and 4.

5 is a layer of canvas following which is a rubber layer 6 with succeeding canvas and rubber layers 7.

8 designates the metal receptacle which is so formed as to produce an annular external groove 9 with a flanged top 10. I cover the receptacle 8 with a casing of canvas or the like fabric, the casing thus forming a bag which closely fits the receptacle and is bound to it.

Fig. 6 shows the canvas fabric 11 in the shape in which it is cut out before being applied to the receptacle and as shown it consists of a center portion with radiating leaves 12, preferably about eight in number, as indicated, with notches 13 between the leaves, so that when the canvas is applied to the receptacle and the leaves are laid flat against the receptacle, the notches 13 will be substantially closed, but there will be narrow slits 14 formed as indicated in Fig. 3. Between the canvas 11 and the receptacle 8 is a thin layer of rubber 34 which vulcanizes the canvas thereto, although I do not depend upon this vulcanization solely for securing the canvas to the receptacle. In Fig. 1 this intervening rubber layer is shown as thicker than in actual practice for illustrative purposes. The upper ends of the leaves 12 are bent in the groove 9 to conform to the shape thereof and a string 16 is wound around several times and then tied to lock the fabric in the groove. The string 16 does not completely fill the groove, so that there is sufficient of the groove left for the interlocking of that portion of the tire which fits therein as will be described. Fig. 9 shows another form of rubber sheet 34' which is in the form of a complete circle, instead of being similar to the canvas bag 11. The canvas covered receptacle is then placed in its pocket in the tread, and finally vulcanized therein, the vulcanization of the rubber being perfectly effected with the canvas and also with the string 16, so that the receptacle is most firmly secured. It might be stated in other words, that the rubber 1 surrounding the neck of the receptacle is prevented from expanding or stretching and slipping over the enlarged bulbous portion of the receptacle, by reason of the string 16 which is vulcanized around the inner rim of the encircling rubber, the string being non-stretchable and acting as a ring of fixed size which alone would probably furnish sufficient security. However, in addition to this, the inner face of the rubber is vulcanized to the fabric surrounding the bulbous portion, thereby affording the requisite security. It is obvious that before the receptacle can be torn from its position the string 16 would have to enlarge or else the considerable mass of rubber surrounding it would have to be torn bodily from the tread. It will be noted that the tread portion is not weakened by the formation of the pockets therein which receive the receptacles, but on the contrary is strengthened by reason of the reinforcing string and canvas fabric which is permanently vulcanized and forms a lining permanently secured to the inner surface of the cavity in the tire. The slits 14 also promote the security of fastening, as they permit the groove to interlock with the edges of the leaves 12. This also permits the inner layer of rubber to vulcanize with the main body of rubber, which is outside of the canvas.

17 designates the stud preferably of rubber which has a lower flange 18 and an upper flange 19 forming an annular groove 20 between the two flanges. A layer of canvas 21 is vulcanized to the body of the stud and the stud has an interior cavity 22 which communicates with the central perforation 23 forming a shoulder 24 which is reinforced by the canvas 21. Within the receptacle 8 is a dished washer 25 inverted so that its flange 26 rests upon the bottom of the receptacle 8. The washer 25 has a buttonhole slot 27.

28 is an anchor pin, the upper end of which has a head 29 and the lower end has a cross bar 30. The stud is engaged in the receptacle by inserting the cross bar 30 through the buttonhole slot 27 and the stud is then turned about one-quarter around and then the rubber stud 17 is inserted by forcing it into the receptacle so that the head of the anchor pin 29 enters through the orifice 23 into the cavity 22 and engages the shoulder 24, while the lower flange 18 of the stud engages below a shoulder 31 formed in the receptacle. After the stud has been inserted it is locked therein by the anchor pin and by the shoulder 31.

The canvas layer 2, as indicated in Fig. 7, is slit for a short distance at 32 to enable the flange 10 of the receptacle to pass the perforation 33 in the canvas. The perforation is of a size to make a snug fit in the exterior groove portion of the receptacle, and the circular face of the slitted perforation joins the narrow diameter of the receptacle, so when the canvas layer is vulcanized to the rubber it binds the slit together in the groove of the receptacle, and forms a strong barrier against the receptacle pulling out.

What I claim is:

1. In a tire, a metal receptacle in the tread portion thereof, said receptacle having an external groove, a bag of fabric enveloping the receptacle and vulcanized thereto, and additional means for securing the fabric in said groove.

2. In a tire, a metal receptacle having an external shoulder, a canvas casing around the receptacle, string binding the fabric over said shoulder, said fabric being vulcanized in the tire.

3. In a tire, a metal receptacle having an external groove near its top, a canvas casing outside the receptacle, string wound in said groove and binding the canvas therein in the inner part of the groove, the body portion of the tire projecting into the outer portion of said groove around said string.

4. In a tire, a receptacle in the tread portion thereof, said receptacle having an internal shoulder, an anchor plate in the receptacle below the shoulder and having a slot, an anchor pin projecting through the slot with a cross bar below the anchor plate, a stud in the receptacle, said anchor pin projecting into said stud and engaging the same.

5. In a tire, a receptacle in the tread portion thereof, said receptacle having an internal shoulder, an anchor plate in the receptacle below the shoulder and having a slot, an anchor pin projecting through the slot with a cross bar below the anchor plate, a stud in the receptacle, said anchor pin projecting into said stud and engaging the same, said anchor pin having a head which engages an internal shoulder in the rubber stud.

6. As a new article of manufacture, a detachable rubber stud for a vehicle tire having external flanges at its top and bottom forming an intermediate external groove, and formed with an internal cavity with a perforation extending through the bottom part of the stud to the cavity and forming a shoulder at its junction with the cavity.

7. As a new article of manufacture, a detachable stud for a vehicle tire, said stud being formed of rubber and with a canvas layer vulcanized in the body portion thereof intermediate the ends of the stud.

8. As a new article of manufacture, a detachable rubber stud for a vehicle tire having external flanges at its top and bottom forming an intermediate external groove, and formed with an internal cavity with a perforation extending through the bottom part of the stud to the cavity and forming a shoulder at its junction with the cavity, and a layer of canvas vulcanized in the stud flush with the internal shoulder.

9. In a tire, a metal receptacle in the tread portion thereof, a canvas casing around the receptacle and vulcanized in the tire, said casing comprising a bottom portion with radiating leaves which lie against the side walls of the receptacle forming slits between the leaves.

10. In a tire, a metal receptacle in the tread portion thereof, a canvas casing around the receptacle and vulcanized in the tire, said casing comprising a bottom portion with radiating leaves which lie against the side walls of the receptacle forming slits between the leaves, the top of said leaves bound to said receptacle near its top.

11. In a tire, a metal receptacle in the tread portion thereof, a canvas casing around the receptacle and vulcanized in the tire, said casing comprising a bottom portion with radiating leaves which lie against the side walls of the receptacle forming slits between the leaves, said casing being vulcanized to the metal receptacle, and the rubber on both sides of the casing communicating through the slits in the casing.

12. In a tire, a receptacle in the tread portion thereof, said receptacle having a flange at its top and a groove below the flange, a perforated canvas layer, provided with slits engaging said groove, for the purpose described.

In testimony whereof, I have hereunto set my hand at Los Angeles, California, this 8th day of July 1909.

JUNIUS A. BOWDEN.

In presence of—
 ARTHUR P. KNIGHT,
 GLADYS RUSSELL.